United States Patent
Ng

(10) Patent No.: US 8,702,309 B2
(45) Date of Patent: Apr. 22, 2014

(54) LINEAR MOTION BEARING WITH PLATE RETAINING STRUCTURE HAVING A PLURALITY OF PIECES

(75) Inventor: Alison Ng, New York, NY (US)

(73) Assignee: Thomson Industries, Inc., Amherst, NY (US)

(*) Notice: Subject to any disclaimer, the term of this patent is extended or adjusted under 35 U.S.C. 154(b) by 0 days.

(21) Appl. No.: 13/810,096

(22) PCT Filed: Jul. 15, 2011

(86) PCT No.: PCT/US2011/044151
§ 371 (c)(1),
(2), (4) Date: Mar. 28, 2013

(87) PCT Pub. No.: WO2012/009616
PCT Pub. Date: Jan. 19, 2012

(65) Prior Publication Data
US 2013/0216163 A1   Aug. 22, 2013

Related U.S. Application Data

(60) Provisional application No. 61/364,566, filed on Jul. 15, 2010.

(51) Int. Cl.
*F16C 29/06* (2006.01)
*F16C 29/04* (2006.01)
*B21D 53/10* (2006.01)

(52) U.S. Cl.
USPC .............................. 384/43; 384/49; 29/898.07

(58) Field of Classification Search
USPC .............. 384/43, 44, 46, 47, 49, 57, 59, 117, 384/306, 308, 309, 312; 29/898.03, 898.07
See application file for complete search history.

(56) References Cited

U.S. PATENT DOCUMENTS

| | | | |
|---|---|---|---|
| 3,545,826 A | 12/1970 | Magee et al. | |
| 4,204,717 A | 5/1980 | Brandenstein et al. | |
| 5,346,313 A | 9/1994 | Ng | |
| 5,558,442 A * | 9/1996 | Ng | 384/43 |
| 5,613,780 A * | 3/1997 | Ng | 384/43 |
| 5,829,882 A * | 11/1998 | Ng et al. | 384/43 |
| 6,908,228 B2 * | 6/2005 | Dalessandro et al. | 384/43 |
| 8,460,116 B1 * | 6/2013 | Smith | 464/167 |

(Continued)

FOREIGN PATENT DOCUMENTS

| | | |
|---|---|---|
| EP | 1645762 A2 | 4/2006 |
| WO | 00/25034 A1 | 5/2000 |

*Primary Examiner* — Marcus Charles
*Assistant Examiner* — Adam D Rogers
(74) *Attorney, Agent, or Firm* — Dilworth & Barrese, LLP.

(57) ABSTRACT

A linear motion bearing assembly comprising a ball retainer structure having at least a portion of a plurality of open axial ball tracks formed therein. The ball tracks include an open load bearing portion, an open return portion and turnarounds interconnecting the load bearing and return portions. A plurality of bearing balls are disposed in the ball tracks. A plurality of load bearing plates are axially positioned adjacent the ball retainer structure for receiving load from the balls disposed in the load bearing portion of the ball tracks. A bearing plate to housing intermediary load structure comprises a plurality of pieces and defines at least two spaces in between the pieces. The bearing plate to housing intermediary load structure extends circumferentially around the ball retaining structure. An inner arc of the pieces have a radius of curvature corresponding to a radius of curvature of the ball retainer structure.

20 Claims, 5 Drawing Sheets

(56) References Cited

U.S. PATENT DOCUMENTS

| | | | |
|---|---|---|---|
| 2013/0209008 A1* | 8/2013 | Ng | 384/43 |
| 2013/0209009 A1* | 8/2013 | Ng et al. | 384/43 |
| 2013/0216164 A1* | 8/2013 | Ng | 384/43 |
| 2013/0236132 A1* | 9/2013 | Ng | 384/43 |

* cited by examiner

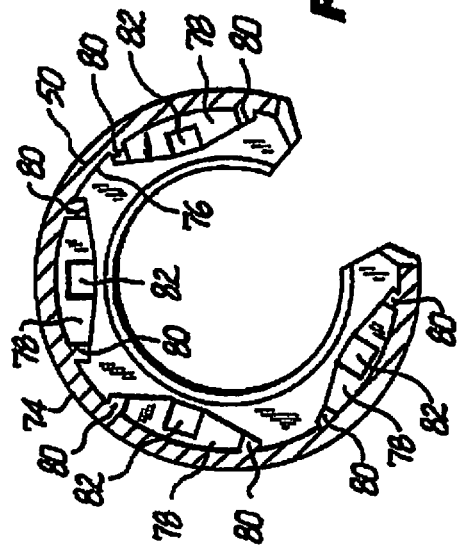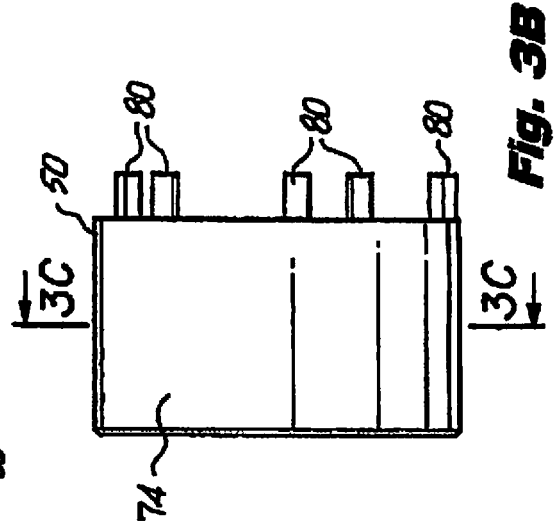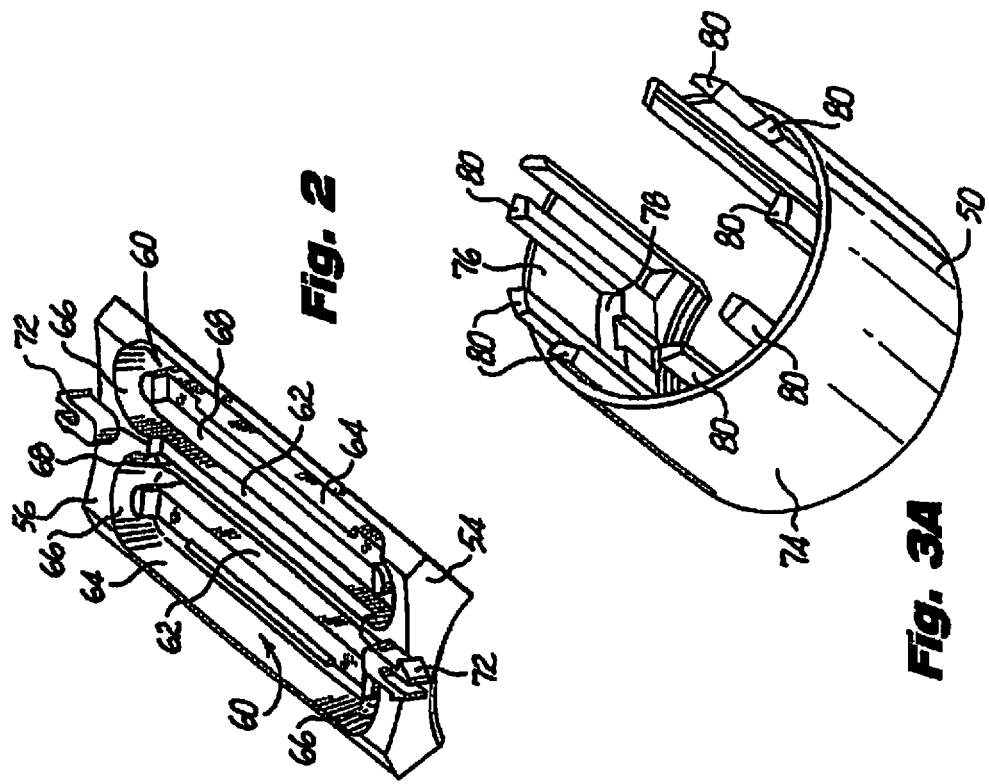

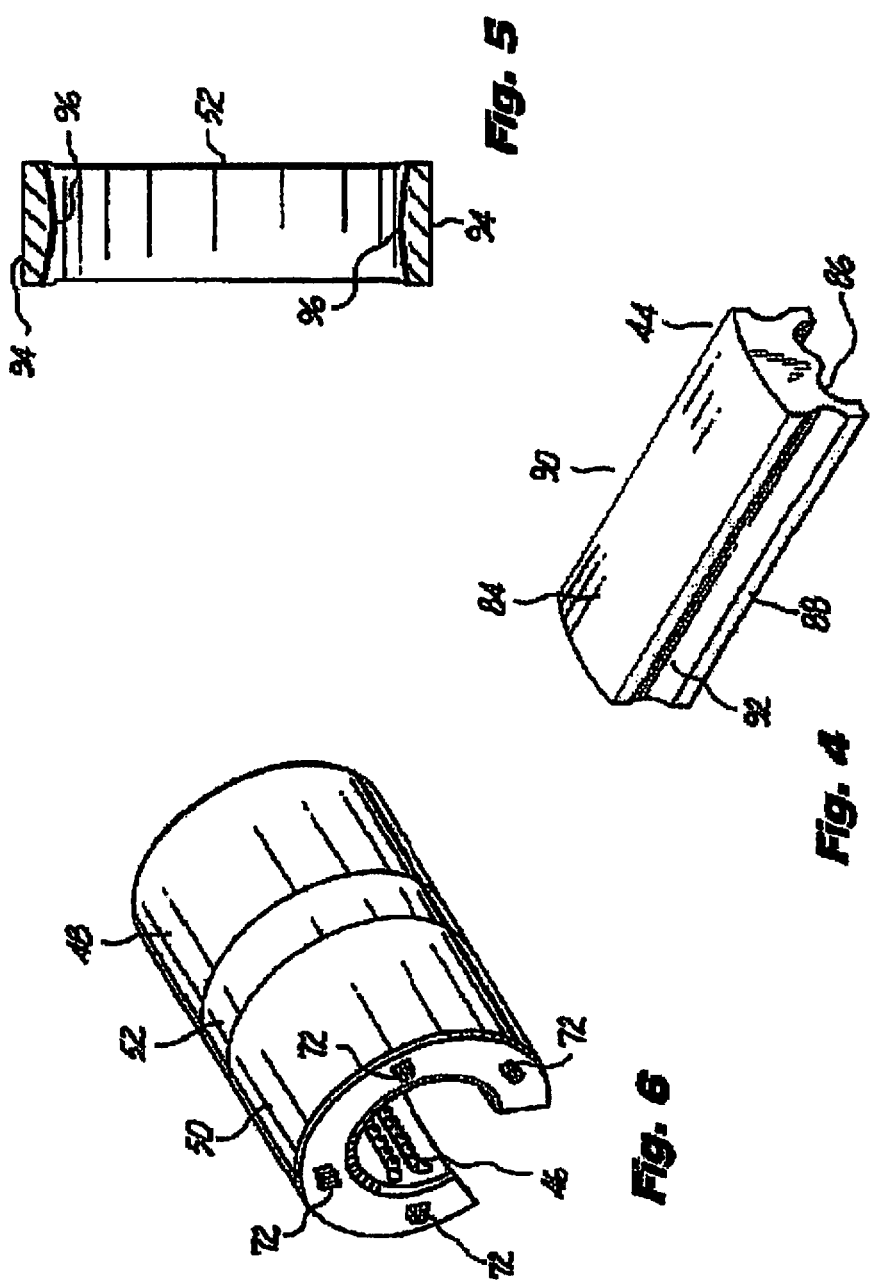

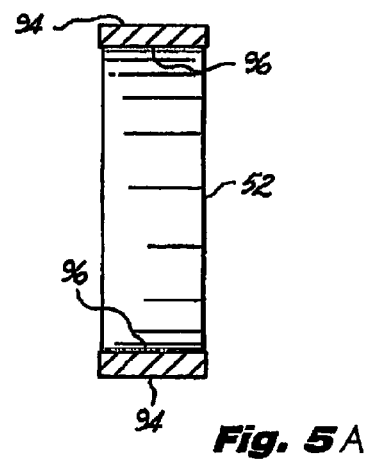
Fig. 5A
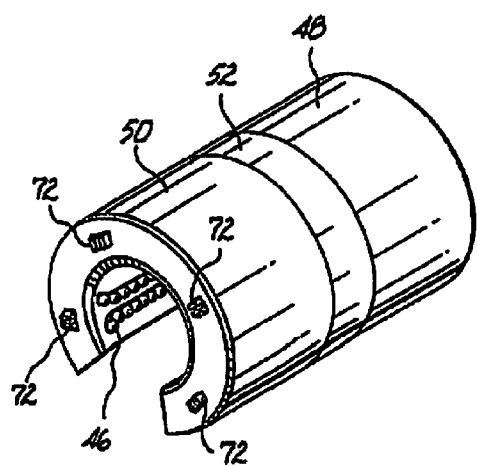
Fig. 6A
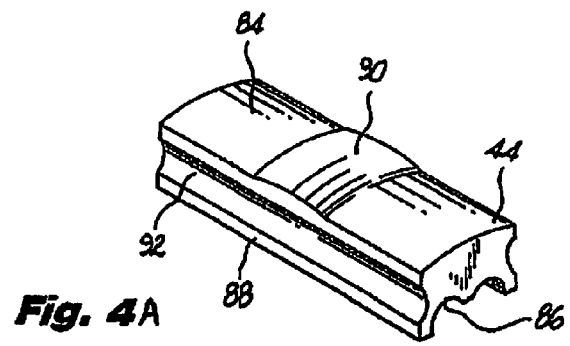
Fig. 4A

LINEAR MOTION BEARING WITH PLATE RETAINING STRUCTURE HAVING A PLURALITY OF PIECES

CROSS REFERENCE TO RELATED APPLICATIONS

This application claims priority to provisional application No. 61/364,566 filed Jul. 15, 2010 entitled "LINEAR MOTION BEARING WITH PLATE RETAINING STRUCTURE HAVING A PLURALITY OF PIECES", the entirety of which is hereby incorporated by reference.

BACKGROUND OF THE INVENTION

1. Field of the Invention

This disclosure relates to a linear bearing.

2. Description of the Related Art

In a linear motion bearing, a generally cylindrical housing is designed to move relative to a shaft. The housing includes a ball retaining structure comprising a plurality of ball retaining segments. Each ball retaining segment includes a plurality of ball bearings moveable in a track. The segments are mounted within the housing so that movement of the housing with respect to the shaft is effectuated through engagement of the bearings with the shaft. As the housing moves, the ball bearings move in respective tracks. This disclosure describes an improvement on these prior art systems.

SUMMARY OF THE INVENTION

One embodiment of the invention is a linear motion bearing assembly. The assembly may comprise a ball retainer structure having at least a portion of a plurality of open axial ball tracks formed therein, the ball tracks including an open load bearing portion, an open return portion and turnarounds interconnecting the load bearing and return portions. The assembly may further comprise an outer housing sleeve extending circumferentially around the ball retainer structure; and a plurality of bearing balls disposed in the ball tracks. The assembly may further comprise a plurality of load bearing plates axially positioned adjacent the ball retainer structure and the outer housing sleeve, the load bearing plates effective to receive a load from the balls disposed in the load bearing portion of the ball tracks. The assembly may further comprise a bearing plate to housing intermediary load structure, the bearing plate to housing intermediary load structure comprising a plurality of pieces and defining at least two spaces in between the pieces, the bearing plate to housing intermediary load structure extending circumferentially around the outer housing sleeve.

Another embodiment of the invention is a linear motion bearing assembly. The assembly may comprise a ball retainer structure having at least a portion of a plurality of open axial ball tracks formed therein, the ball tracks including an open load bearing portion, an open return portion and turnarounds interconnecting the load bearing and return portions. The assembly may further comprise an outer housing sleeve extending circumferentially around the ball retainer structure. The assembly may further comprise a plurality of bearing balls disposed in the ball tracks. The assembly may further comprise a plurality of load bearing plates axially positioned adjacent the ball retainer structure and the outer housing sleeve, the load bearing plates effective to receive a load from the balls disposed in the load bearing portion of the ball tracks. The assembly may further comprise a bearing plate to housing intermediary load structure, the bearing plate to housing intermediary load structure comprising a plurality of pieces and defining at least two spaces in between the pieces, the bearing plate to housing intermediary load structure extending circumferentially around the outer housing sleeve. An inner arc of each piece of the bearing plate to housing intermediate load structure includes a radius of curvature substantially corresponding to a radius of curvature of the outer housing sleeve. The bearing plate to housing intermediary load structure comprises an odd number of pieces. The pieces of the bearing plate to housing intermediary load structure are at least one of cylinders, spheres, flattened cylinders, pyramids, trapezoidal solids, or saddles. The pieces of the bearing plate to housing intermediary load structure are distributed around a circumference of the outer housing sleeve so that respective spaces between the pieces are substantially the same size. A piece of the bearing plate to housing intermediary load structure each include a retention member. The retention member is effective to affix the respective piece to the outer housing sleeve. The outer housing sleeve includes respective mating retention members effective to mate with respective retention members. The pieces are pliant and biased toward a position so that the pieces may be bent and inserted into the outer housing sleeve and thereafter released so that the retention member mates with the mating retention member.

Yet another embodiment of the invention is a method for assembling a linear motion bearing assembly. The method may comprise placing an outer housing sleeve circumferentially around a ball retainer structure, the ball retainer structure having at least a portion of a plurality of open axial ball tracks formed therein, the ball tracks including an open load bearing portion, an open return portion and turnarounds interconnecting the load bearing and return portions. The method may further comprise placing a plurality of bearing balls in the ball tracks. The method may further comprise placing a plurality of load bearing plates axially adjacent the ball retainer structure, the load bearing plates effective to receive a load from the balls disposed in the load bearing portion of the ball tracks. The method may further comprise inserting a bearing plate to housing intermediary load structure into the outer housing sleeve, the bearing plate to housing intermediary load structure comprising a plurality of pieces and defining at least two spaces in between the pieces, the bearing plate to housing intermediary load structure extending circumferentially around the outer housing sleeve.

BRIEF DESCRIPTION OF THE DRAWINGS

The drawings constitute a part of the specification and include exemplary embodiments of the present invention and illustrate various objects and features thereof.

FIG. 2 is a perspective view of a ball retainer segment;

FIG. 3A is a perspective view of a sleeve portion of the outer housing of the linear motion bearing assembly of FIG. 1.

FIG. 3B is a side view of the sleeve portion of FIG. 3A.

FIG. 3C is a cross-sectional view taken along line 3C-3C in FIG. 3B of the sleeve portion of FIG. 3A.

FIGS. 4 and 4A are perspective views of the load bearing plate in accordance with the linear motion bearing assembly of FIG. 1.

FIGS. 5 and 5A are cross-sectioned views of the bearing plate to housing intermediary taken along line 5-5 of FIG. 1.

FIGS. 6 and 6A are perspective views of the assembled linear motion bearing assembly of FIG. 1.

DETAILED DESCRIPTION OF THE PREFERRED EMBODIMENT(S)

Figure 1:
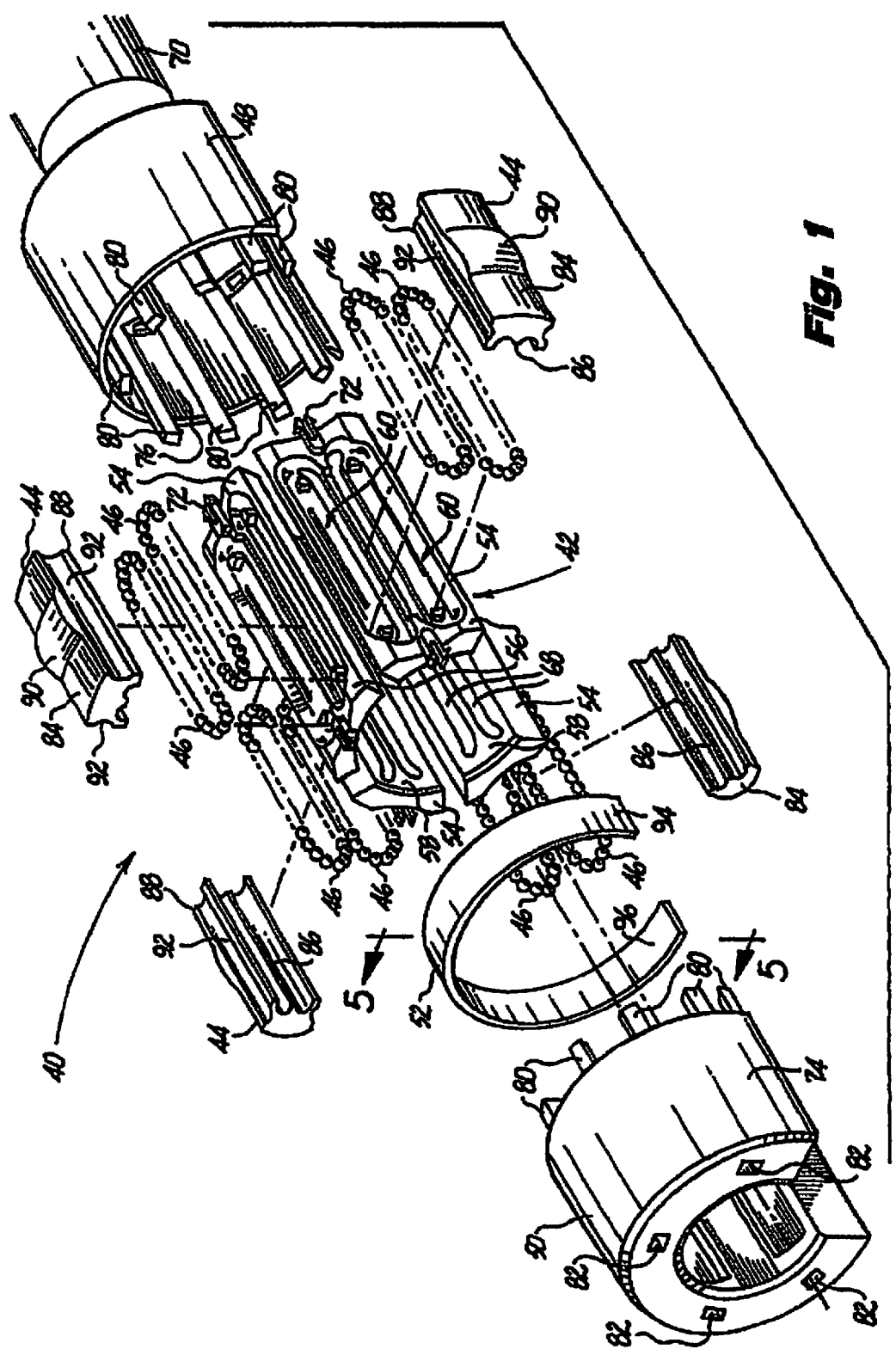
FIG. 1 is an exploded perspective view of a linear motion bearing assembly.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Referring to FIGS. 1-6A, there is shown a linear motion open-type bearing assembly 40. The bearing assembly includes ball retainer structure, shown generally at 42, load bearing plates 44, bearing balls 46, outer housing sleeves 48, 50 and bearing plate to housing intermediary load structure 52.

Focusing on FIG. 2, ball retainer structure 42, in one example, comprises four ball retainer segments 54, each operatively associated with adjacent ball retainer segments along longitudinal sides thereof to form a polygonally shaped ball retainer structure having a bore there through for receiving a shaft 70. Each ball retainer segment 54 includes an outer radial surface 56 and an inner radial surface 58. Axial ball tracks 60 are formed in the outer radial surface 56 of each ball retainer segment 54 and include load bearing portions 62, return portions 64 and turnarounds 66. The load bearing and return portions of the ball tracks in this embodiment are undercut to facilitate loading and retention of the bearing balls 46 therein. This also eliminates the need for a separate retainer structure to keep the bearing balls in the ball tracks. A longitudinal bore 68 in the inner radial surface 58 of the ball retainer segment 54 extends substantially the length of the load bearing portions 62 and accesses shaft 70. Although shaft 70 is illustrated as a substantially cylindrical shaft, support members of other configurations may also be used.

A plurality of bearing balls 46 are disposed in the ball tracks 60 with those bearing balls 46 in the load bearing tracks 62 extending at least partially into longitudinal bores 68 to contact support shaft 70. In this embodiment, a pair of axial ball tracks 60 are formed in each outer radial surface 56 of the ball retainer segment with the corresponding load bearing tracks being oriented in substantially parallel adjacent relation. This orientation facilitates enhanced load capacity and maximizes space utilization for a more compact and efficient bearing ball arrangement. A locking structure in the form of locking clips 72 are formed on opposing longitudinal ends of each ball retainer segment 54 to facilitate assembly with outer housing sleeves 48, 50, discussed in greater detail herein below.

Referring now to FIGS. 1 and 3A-C, the linear motion bearing assembly in accordance with one preferred embodiment includes a pair of outer housing sleeves 48, 50 which, when assembled serve to close and protect the exposed outer radial surfaces 56 of ball retainer structure 42.

The outer radial surface 74 of sleeves 48, 50 are preferably of a smooth cylindrical shape and are configured and dimensioned to fit within a mounting bore of a tool carriage (not shown). The inner radial surface 76 of sleeves 48, 50 include mounting surfaces 78 which are configured to receive at least a portion of load bearing plates 44 therein. These mounting surfaces 78 further include extension portions 80 which define a mounting space for bearing plate to housing intermediary load structure 52, described in greater detail below. Mounting surfaces 78 may be recessed from outer radial surface 74 by a distance approximating the cross-sectional radial thickness of bearing plate to housing intermediary load structure 52. In this manner, the outer housing sleeves 48, 50 and the bearing plate to housing intermediary load structure 52 combine to form a relatively smooth and uniform outer radial surface of the linear motion bearing assembly 40. See, FIGS. 6 and 6A.

In this embodiment, mounting surfaces 78 are configured to fit the shape of individual ball retainer segments 54. A plurality of locking bores 82 are formed in respective ends of sleeves 48, 50 in alignment with locking clips 72 of ball retainer segments 54. Thus, when the ball retainer segments 54 are assembled into the sleeves 48, 50, locking clip 72 extends into respective locking bores 82 and assists in holding linear motion bearing assembly 40 together.

Referring now to FIGS. 1, 4 and 4A, a plurality of individual load bearing plates 44 are incorporated into the linear motion bearing assembly 40 and serve to receive load from the bearing balls 46 in contact with shaft 70. In the embodiment of FIGS. 4 and 4A, load bearing plate 44 is elongated along the longitudinal axis of the bearing assembly and includes an outer radial surface 84, an inner radial surface 86, and a pair of side wall surfaces 88. The outer radial surface 84 is substantially accurate and may include a crown portion 90 disposed on the outer radial surface 84 in a medial position. Crown portion 90 is configured and dimensioned to permit the load bearing plates 44 to rock both circumferentially and longitudinally into and out of parallelism with the axes of the ball retainer structure 42.

The inner radial surface 86 of the load bearing plate is advantageously provided with a pair of axial grooves which serve as the upper surface of load bearing portions 62 of ball tracks 60. By providing a single load bearing plate 44 for each pair of load bearing portions 62 in each outer radial surface 56, the linear motion bearing assembly 40 is easier to fabricate and assemble. Further, the bearing assembly has a high load bearing capacity.

In this embodiment, a longitudinal groove 92 is formed in each side wall surface 88 of load bearing plates 44. These grooves 92 make up a side wall of the axial ball tracks 60 and guide bearing balls 46 as they move through the return portion thereof.

Referring now to FIGS. 1, 5, 5A, 6 and 6A, bearing plate to housing intermediary load structure 52 is illustrated in a C-ring configuration having an outer radial surface 94 conforming substantially in dimension to the outer radial surface 74 of sleeves 48, 50. In this embodiment, the inner radial surface 96 is arcuate (FIG. 5) or substantially parallel (FIG. 5A) to the outer radial surface and is configured and dimensioned, when assembled, to contact crown portion 90 of load bearing plates 44. In an example (FIG. 4A), the radius of curvature of the crown portion 90 in the transverse direction is smaller than the radius of curvature of the inner radial surface of the bearing plate to housing intermediary load structure 52. This configuration allows the plates to rock circumferentially with respect to the inner surface of the bearing plate to housing intermediary load structure 52. In other examples, crown portion 90 is substantially flat as shown in FIG. 4.

Further, referring to FIGS. 1, 6 and 6A, the bearing plate to housing intermediary load structure 52 encompasses and engages extension portions 80 of sleeve 48, 50 to assist in enclosing and protecting ball retainer structure 42. Although shown in a narrow width, the bearing plate to housing intermediary load structure 52 may extend substantially the entire longitudinal length of the bearing assembly. The bearing plate to housing intermediary load structure is preferably formed of a hard abrasion resistant material such as, for example, stainless steel or ceramic. Alternatively, a softer material such as bronze or aluminum may also be used.

Figure 7:
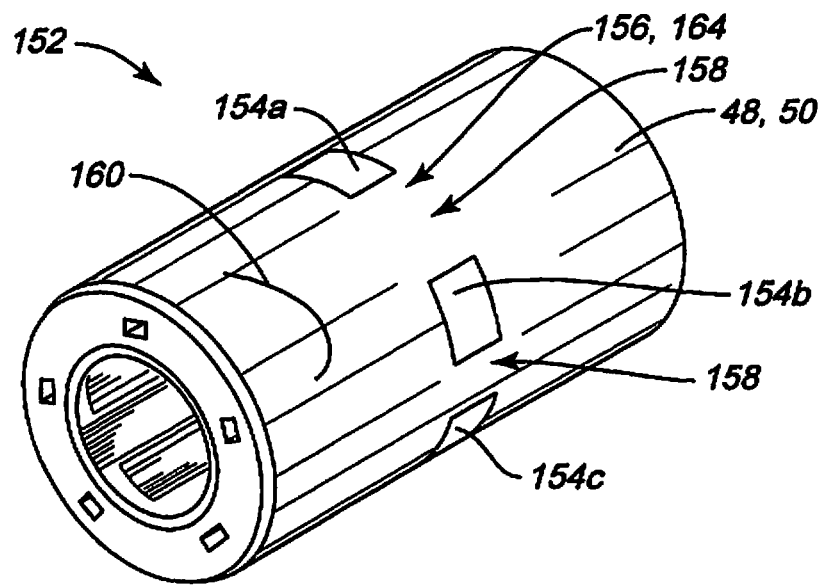
FIG. 7 is a perspective view of a linear motion bearing assembly.
Figure 8:
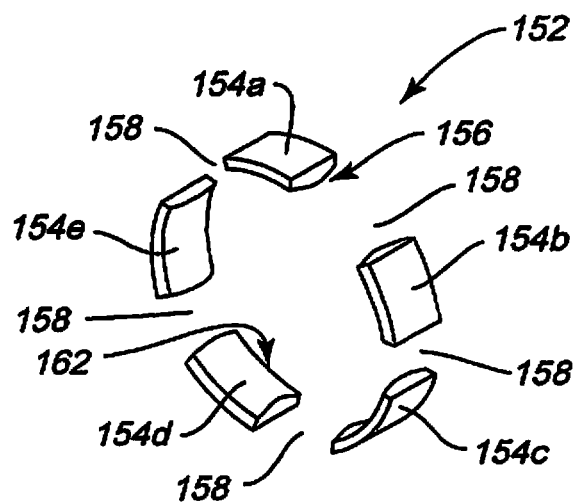
FIG. 8 is an exploded perspective view of a bearing plate to housing intermediary load structure.

FIGS. 7 and 8 are perspective view drawings of another bearing plate to housing intermediary load structure 152. Bearing plate to housing intermediary load structure 54 in FIGS. 1-6 was substantially one piece and monolithic. Bearing plate to housing intermediary load structure 152 is comprised of at least two discrete pieces 154 with spaces 158 in between pieces 154. Five pieces 154a, 154b, 154c, 154d, 154e are shown in FIG. 8 though any number of pieces could be used. Pieces 154 may be cylinders, spheres, flattened cylinders, pyramids, trapezoidal solid, saddle. etc. An odd number of pieces may make it easier to tune bearing plate to housing intermediary load structure 152. Pieces 154 may be distributed around a circumference of sleeve 48, 50 so that each space 158 between each piece 154 is of the same size. Sleeve 48, 50 may comprise multiple pieces or a single piece.

Each piece 154 has an internal arc with a radius of curvature 162 (FIG. 8) that corresponds to or is slightly larger than a radius of curvature 160 of outer housing sleeve 48, 50. The inventor has discovered that the tolerance accuracy needed to manufacture bearing plate to housing intermediary load structure 52 (FIGS. 1-6A) is quite high and therefore difficult and expensive to produce. In fact, a high percentage of manufactured pieces may need to be discarded because of the high necessary tolerances. If bearing plate to housing intermediary load structure 52 includes dimensions too far removed from defined tolerances, excess unbalanced pressure may be placed on outer housing sleeve 48, 50 and then on bearing balls 46 (FIG. 1).

In contrast, tolerance accuracy requirements are lower for bearing plate to housing intermediary load structure 152 having multiple pieces 154. Each piece 154 requires less tolerance accuracy which results in faster, less expensive manufacturing. Pieces 154 are less sensitive to twisting forces applied to outer housing sleeve 48, 50. Bearing plate to housing intermediary load structure 152 is less sensitive to out of "roundness" from each piece 154. Less material is used for bearing plate to housing intermediary load structure 152 and more manufacturing methods are available. Powder metal could be used to manufacture pieces 154.

A retention member 156 (best seen in FIG. 8) may be used to affix bearing plate to housing intermediary load structure 152 to outer housing sleeve 48,50. Retention member 156 could be, for example, a flare from each piece 154, a male extension, a female extension, etc. A corresponding mating retention member 164 may be disposed in outer housing sleeve 48, 50. Mating retention member 164 could be, for example, a recess, a female extension, a male extension, etc. Each piece 154 may be pliant and biased toward the position shown in the figures. In this way, to assemble, each piece 154 may be pinched and inserted into recesses 164 of outer housing sleeve 48, 50 so that flares 156 are bent inwardly. The bias then causes piece 154 to resume the position shown to mate with recesses 158.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A linear motion bearing assembly comprising:
   a ball retainer structure having at least a portion of a plurality of open axial ball tracks formed therein, the ball tracks including an open load bearing portion, an open return portion and turnarounds interconnecting the open load bearing portion and the open return portion;
   an outer housing sleeve extending circumferentially around the ball retainer structure;
   a plurality of bearing balls disposed in the ball tracks;
   a plurality of load bearing plates axially positioned adjacent the ball retainer structure and the outer housing sleeve, the plurality of load bearing plates receive a load from the plurality of bearing balls disposed in the load bearing portion of the open axial ball tracks; and
   a bearing plate to housing intermediary load structure, the bearing plate to housing intermediary load structure comprising a plurality of pieces and defining a space between each of the plurality of pieces, the bearing plate to housing intermediary load structure extending circumferentially around the outer housing sleeve.

2. The linear motion bearing assembly as recited in claim 1, wherein an inner arc of at least one piece of the bearing plate to housing intermediate load structure includes a radius of curvature corresponding to a radius of curvature of the outer housing sleeve.

3. The linear motion bearing assembly as recited in claim 1, wherein the bearing plate to housing intermediary load structure comprises an odd number of the plurality of pieces.

4. The linear motion bearing assembly as recited in claim 3, wherein the plurality of pieces of the bearing plate to housing intermediary load structure is comprised of five pieces.

5. The linear motion bearing assembly as recited in claim 1, wherein at least one piece of the bearing plate to housing intermediary load structure is at least one of a cylinder, a sphere, a flattened cylinder, pyramid, trapezoidal solid, or saddle.

6. The linear motion bearing assembly as recited in claim 1, wherein the plurality of pieces of the bearing plate to housing intermediary load structure are distributed around a circumference of the outer housing sleeve so that each space between the plurality of pieces is substantially the same size.

7. The linear motion bearing assembly as recited in claim 1, wherein at least one of the plurality of pieces of the bearing plate to housing intermediary load structure is made of a powder metal.

8. The linear motion bearing assembly as recited in claim 1, wherein each piece of the plurality of pieces of the bearing plate to housing intermediary load structure includes a retention member, wherein the retention member is effective to affix each piece of the plurality of pieces to the outer housing sleeve.

9. The linear motion bearing assembly as recited in claim 8, wherein the retention member includes at least one of a flare, a male extension, or a female extension.

10. The linear motion bearing assembly as recited in claim 9, wherein the outer housing sleeve includes respective mating retention members, each of the mating retention members are effective to mate with one of the respective retention members.

11. The linear motion bearing assembly as recited in claim 10, wherein each mating retention member includes at least one of a recess, a female extension, or a male extension.

12. The linear motion bearing assembly as recited in claim 10, wherein each piece of the plurality of pieces is pliant and biased toward a position so that the pieces may be bent and inserted into the outer housing sleeve and thereafter released so that the respective retention members mate with the respective mating retention members.

13. A linear motion bearing assembly comprising:
a ball retainer structure having at least a portion of a plurality of open axial ball tracks formed therein, the ball tracks including an open load bearing portion, an open return portion and turnarounds interconnecting the load bearing portion and the open return portion;
an outer housing sleeve extending circumferentially around the ball retainer structure;
a plurality of bearing balls disposed in the ball tracks;
a plurality of load bearing plates axially positioned adjacent the ball retainer structure and the outer housing sleeve, the load bearing plates effective to receive a load from the plurality of bearing balls disposed in the load bearing portion of the ball tracks; and
a bearing plate to housing intermediary load structure, the bearing plate to housing intermediary load structure comprising a plurality of pieces and defining a space between each of the plurality of pieces, the bearing plate to housing intermediary load structure extending circumferentially around the outer housing sleeve;
wherein an inner arc of each piece of the bearing plate to housing intermediate load structure includes a radius of curvature corresponding to a radius of curvature of the outer housing sleeve;
the bearing plate to housing intermediary load structure comprises an odd number of the plurality of pieces;
the plurality of pieces of the bearing plate to housing intermediary load structure are at least one of cylinders, spheres, flattened cylinders, pyramids, trapezoidal solids, or saddles;
the plurality pieces of the bearing plate to housing intermediary load structure are distributed around a circumference of the outer housing sleeve so that the space between each of the plurality of pieces is substantially the same size;
the plurality of pieces of the bearing plate to housing intermediary load structure each include a retention member, wherein each retention member is effective to affix each one of the plurality of pieces to the outer housing sleeve;
the outer housing sleeve includes respective mating retention members and each of the mating retention members are effective to mate with one of the respective retention members; and
the plurality of pieces are pliant and biased toward a position so that the plurality of pieces may be bent and inserted into the outer housing sleeve and thereafter released so that each retention member mates with each mating retention member.

14. The linear motion bearing assembly as recited in claim 13, wherein:
the retention members each include at least one of a flare, a male extension, or a female extension; and
the mating retention members each include at least one of a recess, a female extension, or a male extension.

15. The linear motion bearing assemble as recited in claim 13, wherein the plurality of pieces are made of a powder metal.

16. A method for assembling a linear motion bearing assembly, the method comprising:
placing an outer housing sleeve circumferentially around a ball retainer structure, the ball retainer structure having at least a portion of a plurality of open axial ball tracks formed therein, the ball tracks including an open load bearing portion, an open return portion and turnarounds interconnecting the open load bearing portion and the open return portion;
placing a plurality of bearing balls in the ball tracks;
placing a plurality of load bearing plates axially adjacent the ball retainer structure, the load bearing plates effective to receive a load from the plurality of balls disposed in the load bearing portion of the ball tracks; and
inserting a bearing plate to housing intermediary load structure into the outer housing sleeve, the bearing plate to housing intermediary load structure comprising a plurality of pieces and defining a space between each of the plurality of pieces, the bearing plate to housing intermediary load structure extending circumferentially around the outer housing sleeve.

17. The method as recited in claim 16, wherein an inner arc of at least one piece of the plurality of pieces of the bearing plate to housing intermediate load structure includes a radius of curvature corresponding to a radius of curvature of the outer housing sleeve.

18. The method as recited in claim 16, wherein inserting comprises inserting the plurality of pieces of the bearing plate to housing intermediary load structure around a circumference of the outer housing sleeve so that each space between the plurality of pieces is substantially the same size.

19. The method as recited in claim 16, wherein each one of the plurality of pieces of the bearing plate to housing intermediary load structure includes a retention member, and inserting includes pinching each one of the plurality of pieces and thereafter releasing each of the plurality of pieces to affix each of the plurality of pieces to the outer housing sleeve.

20. The method as recited in claim 19, wherein the outer housing sleeve includes a mating retention member and inserting includes pinching each of the plurality of pieces, mating the retention member with the mating retention member, and releasing each of the plurality of pieces.

* * * * *